(12) United States Patent
Cheng

(10) Patent No.: US 7,558,086 B2
(45) Date of Patent: Jul. 7, 2009

(54) INVERTER CONTROL CIRCUIT WITH A RESONANT FREQUENCY MODULATION FUNCTION

(75) Inventor: Ying-Chang Cheng, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 94 days.

(21) Appl. No.: 11/476,153

(22) Filed: Jun. 28, 2006

(65) Prior Publication Data

US 2008/0002440 A1    Jan. 3, 2008

(51) Int. Cl.
*H02J 3/00* (2006.01)
*H02H 7/122* (2006.01)

(52) U.S. Cl. .................. 363/34; 363/55; 315/287; 323/209

(58) Field of Classification Search .................. 363/15, 363/21.02, 34, 37, 40, 53, 55, 109, 165, 95, 363/131, 132; 315/276, 279, 282, 287; 323/209, 323/297, 298
See application file for complete search history.

(56) References Cited

U.S. PATENT DOCUMENTS

| | | | | |
|---|---|---|---|---|
| 4,706,177 | A * | 11/1987 | Josephson | 363/24 |
| 5,180,991 | A * | 1/1993 | Takashima | 331/1 A |
| 5,977,659 | A * | 11/1999 | Takehara et al. | 307/85 |
| 6,067,236 | A * | 5/2000 | White | 363/16 |
| 6,480,071 | B1 * | 11/2002 | Fujii et al. | 331/74 |
| 6,798,151 | B1 | 9/2004 | Chou et al. | |
| 6,822,458 | B2 * | 11/2004 | Shander | 324/536 |
| 6,839,253 | B2 | 1/2005 | Chou et al. | |
| 6,867,955 | B2 | 3/2005 | Chou et al. | |
| 6,914,365 | B1 | 7/2005 | Chou et al. | |
| 6,940,234 | B2 | 9/2005 | Chou et al. | |
| 6,943,785 | B2 | 9/2005 | Chou et al. | |
| 6,949,867 | B1 | 9/2005 | Chou et al. | |
| 6,949,890 | B2 | 9/2005 | Chou et al. | |
| 6,954,008 | B2 * | 10/2005 | Chou | 307/26 |
| 6,958,582 | B2 | 10/2005 | Chou et al. | |
| 6,969,956 | B1 | 11/2005 | Chou et al. | |
| 7,023,142 | B2 | 4/2006 | Chou et al. | |
| 7,034,467 | B1 | 4/2006 | Chou et al. | |
| 7,045,969 | B1 | 5/2006 | Chou et al. | |
| 2003/0098749 | A1 * | 5/2003 | Terasawa et al. | 331/74 |
| 2005/0116780 | A1 * | 6/2005 | Endo et al. | 331/2 |
| 2005/0174013 | A1 | 8/2005 | Chou et al. | |
| 2005/0242751 | A1 | 11/2005 | Chou et al. | |
| 2006/0109700 | A1 | 5/2006 | Chou et al. | |
| 2007/0024587 | A1 * | 2/2007 | Shiau | 345/166 |

FOREIGN PATENT DOCUMENTS

EP    1806954 A1 *   7/2007

* cited by examiner

*Primary Examiner*—Akm E Ullah
*Assistant Examiner*—M'Baye Diao
(74) *Attorney, Agent, or Firm*—Muncy, Geissler, Olds & Lowe, PLLC

(57) ABSTRACT

An inverter control circuit with a resonant frequency modulation function provides a control circuit module that can modulate different resonant frequencies externally to fit loads of different modes without changing the inverter components such as a voltage transformer or redesigning the circuit layout. The RC oscillation circuit of a resonant frequency controller of the invention includes several separate resistors, and the separate resistors of the RC oscillation circuit are coupled to at least one switcher to form an open circuit or a closed circuit to determine the total resistance of the RC oscillation circuit for modulating different resonant frequencies.

3 Claims, 3 Drawing Sheets

INVERTER CONTROL CIRCUIT WITH A RESONANT FREQUENCY MODULATION FUNCTION

FIELD OF THE INVENTION

The present invention relates to an inverter control circuit with a resonant frequency modulation function, and more particularly to a control circuit module that can modulate a total resistance of different RC oscillation circuits through an external switcher to provide an inverter for outputting different powers to drive a load.

BACKGROUND OF THE INVENTION

In inverter design technologies as disclosed in U.S. Pat. Nos. 7,045,969, 7,034,467, 7,023,142, 6,969,956, 6,958,582, 6,949,890, 6,949,867, 6,943,785, 6,940,234, 6,914,365, 6,867,955, 6,798,151, and 6,839,253 and Publication Nos. 2005/0174013 A1, 2005/0242751 A1, and 2006/0109700 A1, an inverter can be applied to an LCD-TV technology. Since a large LCD-TV is introduced into the specification of LCD-TV gradually, the manufacture of backlight modules becomes increasingly complicated. Regardless of the quantity or length of an electric discharge lamp, a maximum supply of power made by an inverter becomes an important technology for determining whether or not an LCD-TV can be introduced to a large-size LCD-TV specification. In the aforementioned patented technologies, an inverter not only adopts a mid-voltage direct current for a direct drive to provide the best power performance with a lower power loss, but also includes a full-brightness dimming technology and a high-voltage electric arc protection measure to provide a detachable backlight module, so as to facilitate the applications of a backlight module and its introduction to the market.

Since the size of LCD-TV varies greatly and a CCFL used for different sizes of LCD-TV must come with different lengths, therefore inverters must provide different driving powers to fit CCFL with different lengths.

However, existing inverter control circuits provide a single resonant frequency only, and it is necessary to manufacture various inverters with different resonant frequencies to meet different requirements. Thus, finding a way of designing a modular inverter control circuit that allows manufacturers to centralize their inventory management is a subject for existing inverter technologies that demands immediate breakthroughs.

SUMMARY OF THE INVENTION

The primary objective of the present invention is to overcome the foregoing shortcomings and avoid the existing deficiencies by providing a modular inverter control circuit. The so-called modularization refers to an inverter control circuit that can use an external switcher on the same inverter circuit to modulate different total resistances for the RC oscillation circuits and producing different resonant frequencies for an inverter to output different powers to drive a load.

To achieve the foregoing objective, the inverter disclosed in the invention comprises a control unit having a RC oscillation circuit for providing a resonant frequency, a driving unit coupled to the control unit for determining an input electrically connected cycle by the resonant frequency, and a voltage transformation unit coupled to the driving unit and resonant with the resonant frequency for converting a power to drive a back-end load by the inputted electric connection cycle. The RC oscillation circuit comprises a plurality of separate resistors, and the separate resistors of the RC oscillation circuit are coupled to at least one switcher to form an open circuit or a closed circuit of the separate resistors to determine the total resistance of the RC oscillation circuit for modulating different resonant frequencies.

DETAILED DESCRIPTION OF THE PREFERRED EMBODIMENTS

Figure 1:
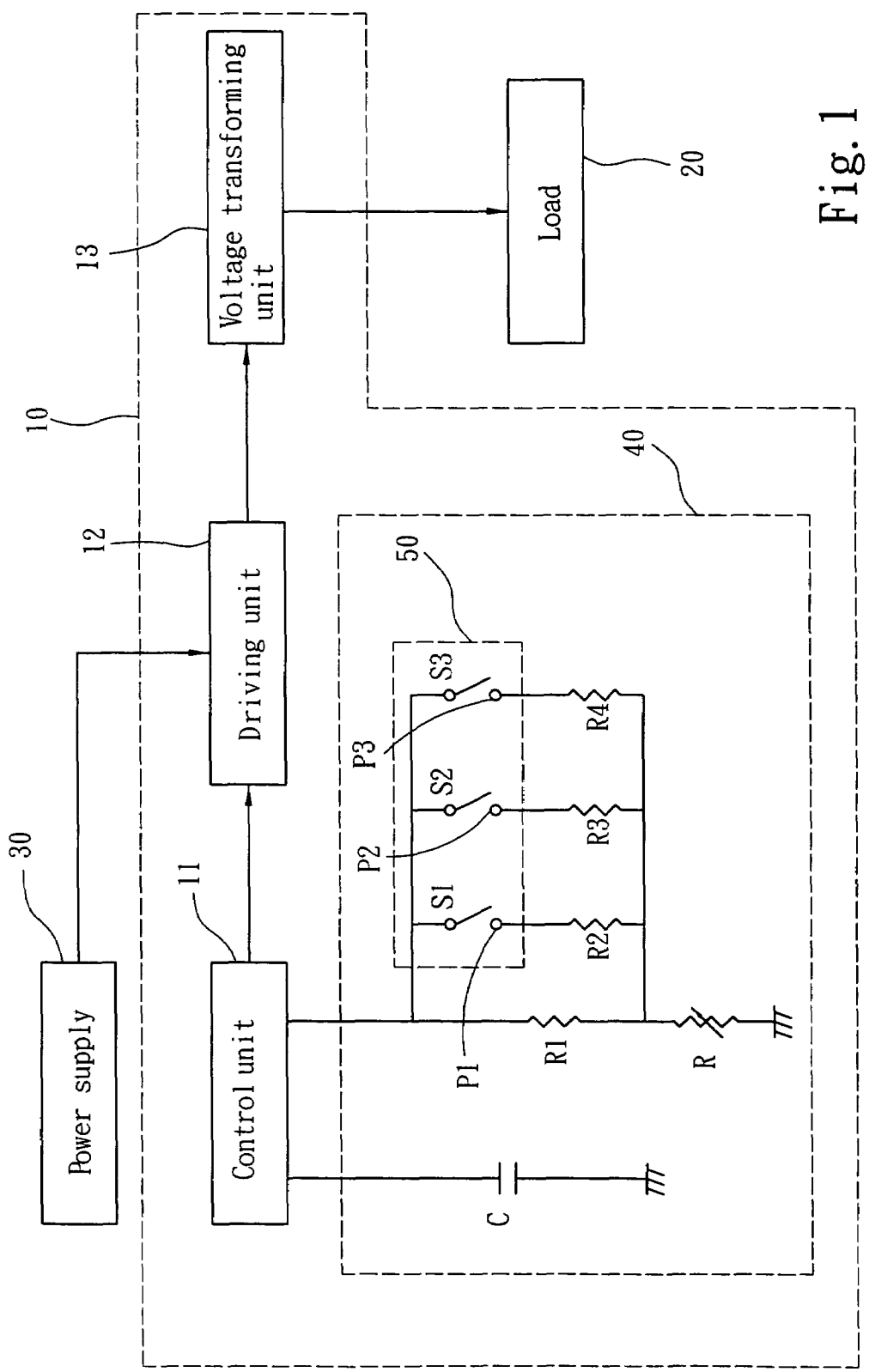
FIG. 1 is a schematic circuit block diagram of the present invention.

The present invention will now be described in more detail hereinafter with reference to the accompanying drawings as follows:

Referring to FIG. 1 for the schematic circuit diagram of the present invention, the present invention discloses an inverter control circuit with a resonant frequency modulation function, and the inverter 10 comprises a RC oscillation circuit 40 having a capacitor C and separate resistors R, R1~R4, a control unit 11 for providing a resonant frequency, a driving unit 12 coupled to the control unit 11 for determining an electrically connected cycle by the resonant frequency, and a voltage transforming unit 13 coupled to the driving unit 12 and resonant with the resonant frequency for converting a front-end power supply 30 by the input electrically connected cycle into a power supply for outputting a power to drive a back-end load 20, and the key point of the present invention resides on the design of modulating the control circuit, and the technologies related to the rectification or modulation of the power supply, the dimming of light, and the power feedback of the load 20 are prior arts applicable to different models of inverters 10 without being restricted to a particular inverter 10.

The main design of the present invention resides on that the RC oscillation circuit 40 is comprised of a plurality of separate resistors R, R1, R2, R3, R4, and the separate resistors R, R1, R2, R3, R4 of the RC oscillation circuit 40 are coupled to at least one switcher 50 to form an open circuit or a closed circuit of the separate resistors R, R1, R2, R3, R4 to determine the total resistance of the RC oscillation circuit 40 for modulating different resonant frequencies. According to the requirements of different specifications, each separate resistor R, R1, R2, R3, R4 could be connected in series, in parallel, or in both series and parallel, and separate resistors R, R1, R2, R3, R4 could be designed separately according to the required resonant frequency of the inverter 10, or the separate resistors R, R1, R2, R3, R4 are divided into a primary standard resistor R and a plurality of secondary modulation resistors R1~R4 as shown in the preferred embodiment of the present invention,. The architecture of the primary standard resistor R adopts a basic resonant frequency and the secondary modulation resistors R1~R4 tunes the resonant frequency according to a load 20 of a different specification. Besides the function of providing a modularization of an inverter control circuit for different resonant frequencies, the present invention further provides a tuning function to stabilize the quality of outputting a resonant frequency for the inverter control circuit.

Figure 2:
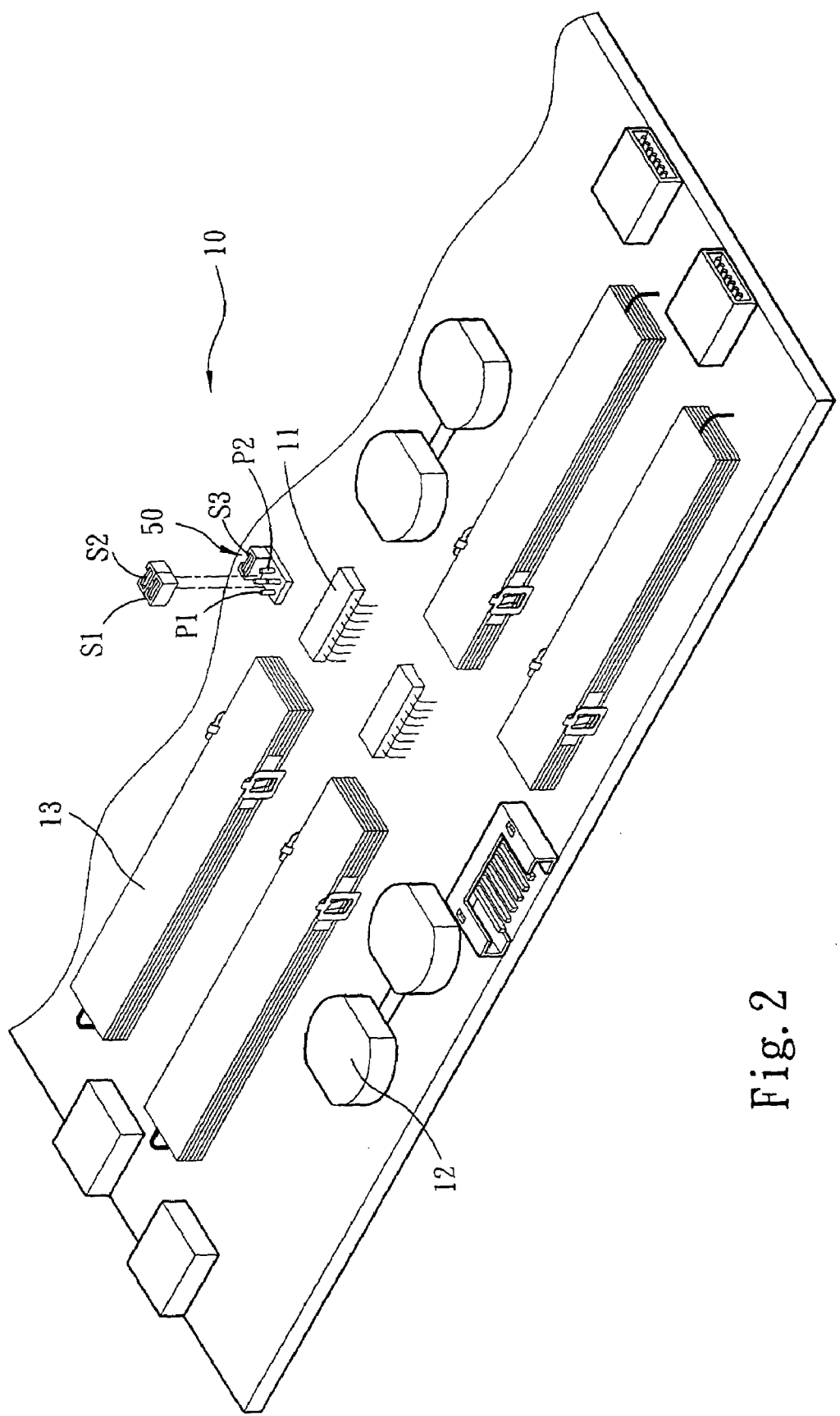
FIG. 2 is a schematic view of a structure according to a first preferred embodiment of the present invention.
Figure 3:
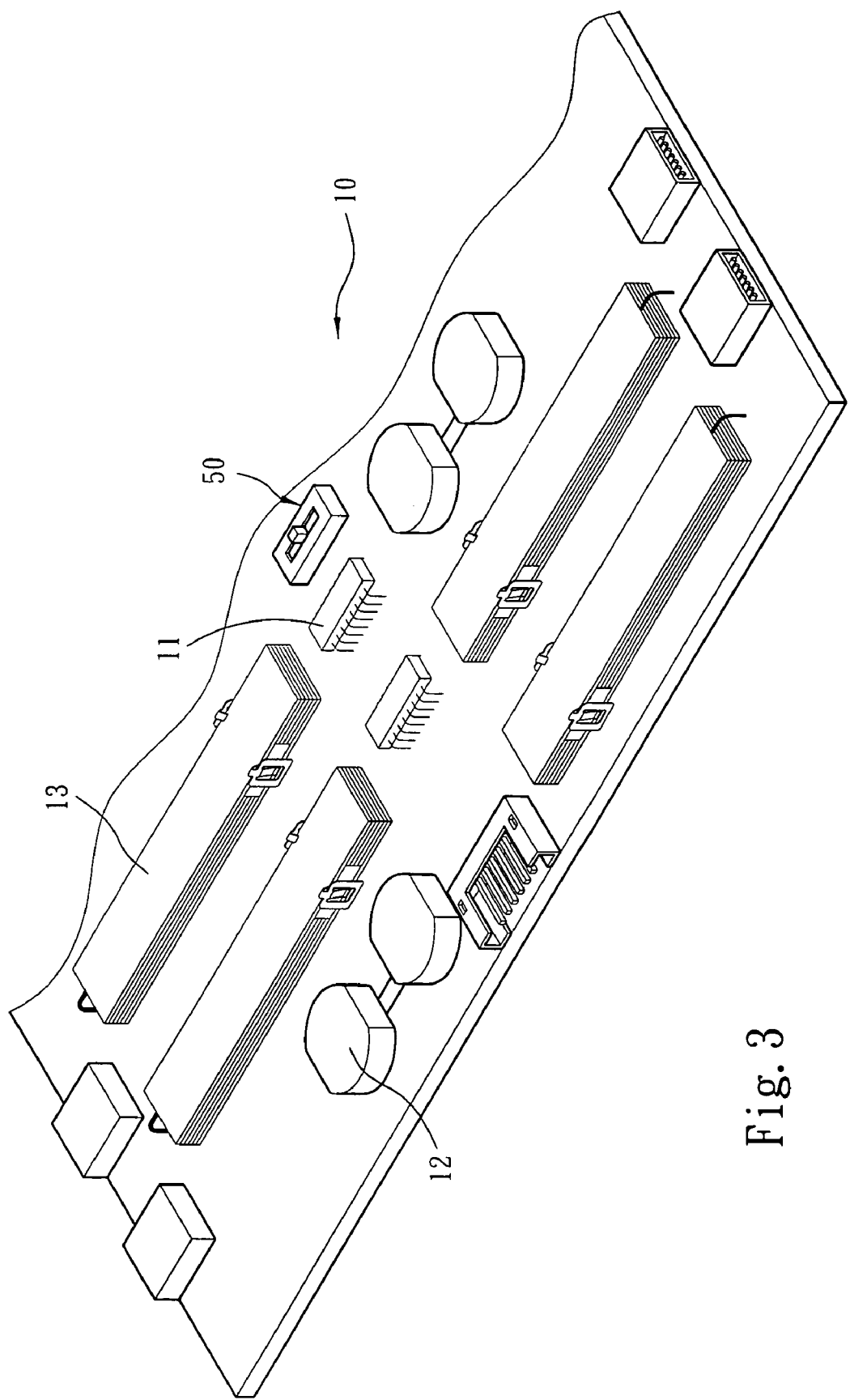
FIG. 3 is a schematic view of a structure according to a second preferred embodiment of the present invention.

The resonant frequency modulation function of the present invention as shown in FIG. 2 can be achieved by using the switcher 50 that includes a plurality of pins P1, P2, P3 coupled to separate nodes of the separate resistors R2, R3, R4, and a plurality of jumpers S1, S2, S3 coupled to the pins P1, P2, P3, or the switcher 50 can be designed as a sectional switch as shown in FIG. 3, such that when the inverter 10 completes its production and exits the factory, the switcher 50 (or jumpers S1, S2, S3) can be controlled externally and directly to determine the open circuit mode or a closed circuit mode of each separate resistor R2, R3, R4, so as to obtain the total resistance of the RC oscillation circuit 40 and produce different resonant frequencies, and allow the inverter 10 to be applied for the load 20 of various different specifications effectively.

While the invention has been described by means of specific embodiments, numerous modifications and variations could be made thereto by those skilled in the art without departing from the scope and spirit of the invention set forth in the claims.

What is claimed is:

1. An inverter, comprising:
a control unit;
an RC oscillation circuit for providing the control unit with a resonant frequency;
a DC power supply;
a driving unit coupled to said DC power supply and said control unit for determining an electrically connected cycle by said resonant frequency; and
a voltage transforming unit coupled to said driving unit and resonant with said resonant frequency for converting a power to drive a back-end load by said electrically connected cycle, said RC oscillation circuit comprises a plurality of separate resistors, and said separate resistors of said RC oscillation circuit are coupled to at least one switch to form an open circuit or a closed circuit for said separate resistors to determine a total resistance of said RC oscillation circuit for modulating different resonant frequencies, said at least one switch including a pin for coupling a corresponding separate resistor and a jumper for coupling said pin, said plurality of separate resistors including a first resistor and a second resistor coupled in series, a plurality of additional resistors, each additional resistor associated with a corresponding switch so as to be selectively connected in parallel to said second resistor and in series with said first resistor.

2. An inverter, comprising:
a control unit;
an RC oscillation circuit for providing the control unit with a resonant frequency;
a DC power supply;
a driving unit coupled to said DC power supply and said control milt for determining an electrically connected cycle by said resonant frequency; and
a voltage transforming unit coupled to said driving unit and resonant with said resonant frequency for converting a power to drive a back-end load by said electrically connected cycle, said RC oscillation circuit comprises a plurality of separate resistors, and said separate resistors of said RC oscillation circuit are coupled to at least one switch to form an open circuit or a closed circuit for said separate resistors to determine a total resistance of said RC oscillation circuit for modulating different resonant frequencies, said at least one switch is a sectional switch, said plurality of separate resistors including a first resistor and a second resistor coupled in series, a plurality of additional resistors, each additional resistor associated with a corresponding switch so as to be selectively connected in parallel to said second resistor and in series with said first resistor.

3. An inverter, comprising:
a control unit;
an RC oscillation circuit for providing the control unit with a resonant frequency;
a DC power supply;
a driving unit coupled to said DC power supply and said control unit for determining an electrically connected cycle by said resonant frequency; and
a voltage transforming unit coupled to said driving unit and resonant with said resonant frequency for converting a power to drive a back-end load by said electrically connected cycle, said RC oscillation circuit comprises a plurality of separate resistors, and said separate resistors of said RC oscillation circuit are coupled to at least one switch to form an open circuit or a closed circuit for said separate resistors to determine a total resistance of said RC oscillation circuit for modulating different resonant frequencies, said separate resistors are divided into a primary standard resistor and a plurality of secondary modulation resistors, said plurality of separate resistors including a first resistor and a second resistor coupled in series, a plurality of additional resistors, each additional resistor associated with a corresponding switch so as to be selectively connected in parallel to said second resistor and in series with said first resistor.

* * * * *